March 22, 1960
L. T. BOWERS
2,929,911
NOZZLE FOR GAS-SHIELDED ARC WELDING
AND METHOD OF USING IT
Filed April 7, 1958
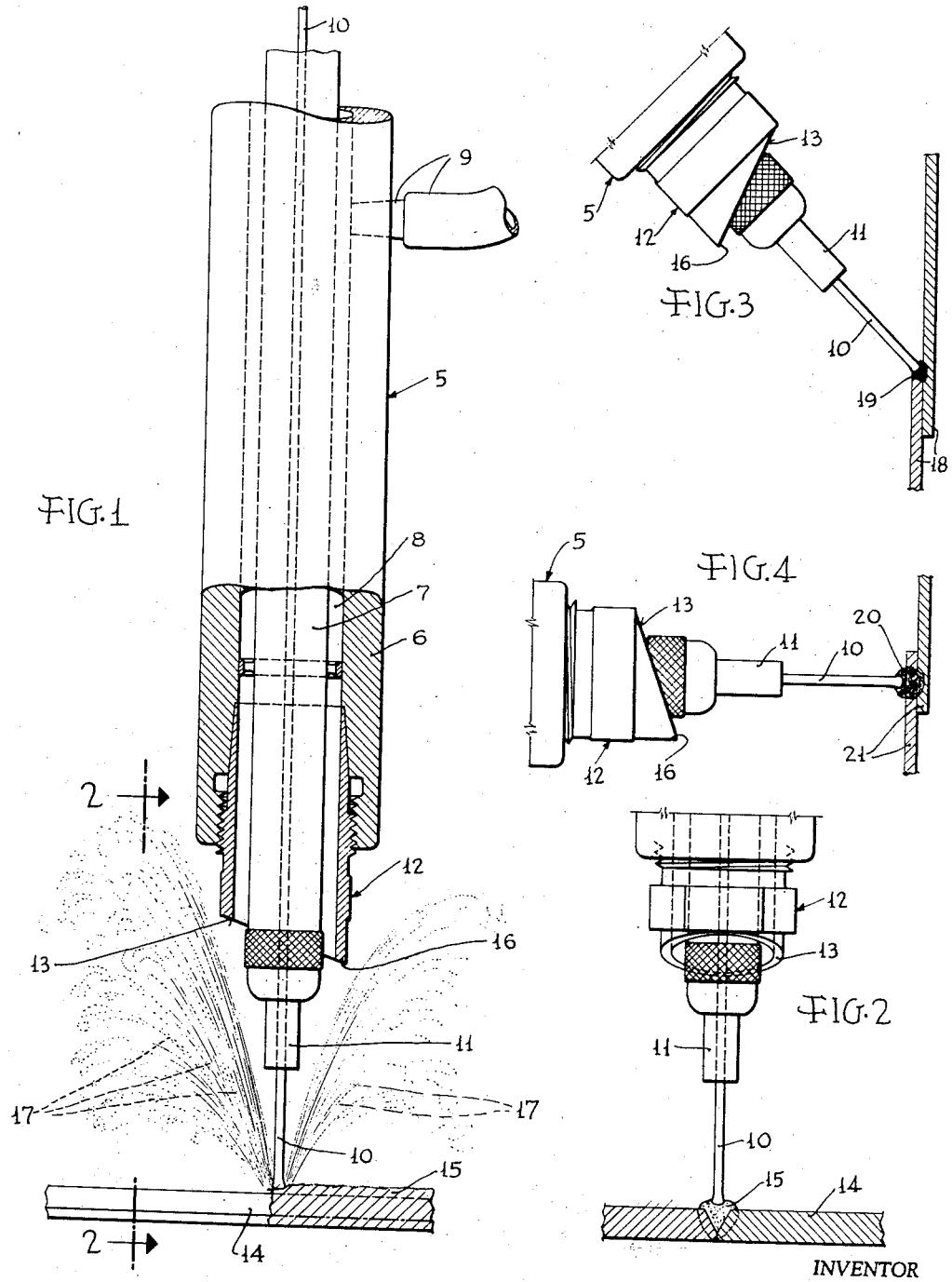
INVENTOR
Lester T. Bowers.
BY Karl L. Schiff
AGENT United States Patent Office 2,929,911
Patented Mar. 22, 1960

2,929,911

NOZZLE FOR GAS-SHIELDED ARC WELDING AND METHOD OF USING IT

Lester T. Bowers, Oreland, Pa., assignor to The Budd Company, Philadelphia, Pa., a corporation of Pennsylvania Application April 7, 1958, Serial No. 726,972

5 Claims. (Cl. 219—74)

The invention relates to a nozzle for supplying gas concentrically around the end of an arc welding electrode, particularly inert gases and carbon dioxide. The invention relates also to a method of using such nozzle. The main field for the new nozzle and its use is seen in connection with automatic welding machines.

The objects, features and importance of the invention may best be understood by a brief outline of the problems involved and of prior attempts to solve them.

For arc welding in a stream of gas it is desirable and well known to surround concentrically the electrode by a nozzle for admitting the shielding gas. However, heavy spatter conditions of the molten metal occur and the known types of concentric nozzles become clogged up within a very short time and, particularly when the shielding gas is carbon dioxide, have to be replaced or laboriously cleaned out at frequent intervals, in some cases about every 15 minutes.

The clogging up of the known nozzles is practically prohibitive and has led to the wide spread adoption of welding equipment supplying the gas from the side of rather than concentrically to the electrode area. It has also been proposed to provide a nozzle with an easily removable, cheap, and therefore expendable, outer end which is to be thrown away at short intervals and to be replaced by another outer end. Both attempts to cope with the problem are unsatisfactory.

The admission of the gas from the side is less desirable for best welding results due to extreme porosity and the frequent replacement of the nozzle end means work interruptions with corresponding delays and expense.

The invention solves the problem by a simple modification of the known type of concentric nozzle and consists therein that the outer edge of the nozzle is slanted or inclined relative to the customary arrangement of this edge at 90° to the electrode. This slanting of the outer end causes most of the spatter to by-pass the nozzle thereby preventing any clogging up and permitting practically indefinite use without requiring cleaning.

The beneficial effect of the new nozzle appears attributable to the prevention or minimization of turbulence of the gas stream, which is the probable cause for the objectionable pattern of spattering with known types of concentric nozzles. The new nozzle does not prevent or minimize the spattering as such, the primary cause of which is believed to be the very fast feed of the welding wire in modern automatic welders, but it renders the spattering harmless in regard to the nozzle.

The invention, its objects, advantages and features, as well as details thereof will be more fully understood from the following description of one embodiment and several uses thereof, which are diagrammatically illustrated in the attached drawing.

In the drawing:

Fig. 1 is a somewhat diagrammatic, fragmentary elevation, partly in section, of an arc welding torch and a work-piece in down-hand welding position;

Fig. 2 is an elevation of the lower end of the same welding torch and a section through the work-piece, the view and the section being taken along line 2—2 of Fig. 1;

Fig. 3 is a diagrammatic side view of the outer end of the welding torch and a section through a work-piece, illustrating fillet lap welding at a 45° angle of the welding torch; and Fig. 4 is an illustration of so-called burn-through welding with the torch being held horizontally, again only the end of the electrode being shown.

The illustrated welding head or torch 5 comprises an outer sleeve 6, an inner sleeve 7, the two separated by a concentric space 8 and in communication by hose and nipple 9 with a (not shown) supply of shielding gas. The inner sleeve 7 provides a guide for the welding wire 10 and has its outer end provided with a removable contact tip 11. Removably held in the outer end of sleeve 6 is a nozzle 12.

The outer edge 13 of nozzle 12 is slanted or inclined relative to the axis of the electrode head. An angle of about 30° to 35° was found satisfactory but other angles such as in the range of 15° to 60° will give acceptable results.

The position of the electrode head 5 with its nozzle 12, tip 11 and weld wire 10 is shown in Figs. 1 and 2 in a customary, down-hand position and distance from work-piece 14. 15 is the weld nugget. Very good results are achieved by arranging and moving the electrode holder so that the farther protruding portion 16 of the nozzle 12 is on the trailing side. Lines 17 illustrate the pattern of the spatter as induced by the new nozzle.

When connecting overlapping work-pieces 18 by depositing a fillet 19 in the angle at the overlap, the position shown in Fig. 3 was found satisfactory. The head 5 is positioned 30°–45° downwardly and the farther protruding portion 16 of nozzle 12 is positioned downwardly.

Similarly, it was found satisfactory in so-called burn-through welding 20 of overlapping work-pieces 21 as shown in Fig. 4, to position head 5 horizontally and again to arrange the farther protruding 16 of nozzle 12 in the lowermost position.

In regard to the procedures illustrated in Figs. 3 and 4 it should however be remarked that satisfactory results were also achieved by arranging the nozzle in the same relation to the direction of welding as in Figs. 1 and 2, that is making farther protruding point 16 the trailing edge.

The invention is not restricted to the illustrated and described embodiments and their details but modifications and adaptations will easily occur to those skilled in the art. It will, for instance, be obvious that the new nozzle need not be a single piece but that the slanted edge may be obtained by adding a sleeve or the like to concentric nozzles of known construction, which sleeve then is to be considered as being a part of the nozzle.

What is claimed is:

1. Welding head for gas shielded arc welding having a nozzle concentrically surrounding an electrode in which the outlet edge is slanted relative to the axis of the nozzle and in which the electrode projects beyond a plane extending perpendicularly to said axis and through the outermost point of said slanted edge.

2. Welding head according to claim 1 in which the inclination of the outlet edge is in the order of 35° relative to the axis of the nozzle.

3. In a method of gas shielded arc welding, of surrounding the electrode with a nozzle for the shielding gas, the nozzle having its outlet edge inclined relative to the axis of the electrode, of arranging the farther projecting portion of said edge behind the electrode relative to the direction of advance of the electrode along the work to be welded.

4. Method according to claim 3 as applied to a welding procedure in which the electrode is held substantially vertical in regard to the substantially horizontal work-piece.

5. Method of shielded arc welding in which the arc welding electrode is surrounded by a nozzle for supplying the shielding gas, the outlet edge of said nozzle being inclined relative to the welding electrode, the work-piece being arranged substantially vertical, and nozzle being arranged with its farther protruding edge below said welding electrode.

References Cited in the file of this patent
UNITED STATES PATENTS

| | | |
|---|---|---|
| 1,840,600 | Peck | Jan. 12, 1932 |
| 2,702,846 | Breymeier | Feb. 22, 1955 |